(12) United States Patent
Sandstrom

(10) Patent No.: US 8,578,983 B2
(45) Date of Patent: Nov. 12, 2013

(54) TIRE WITH RUBBER COMPONENT COMPRISED OF A COMPOSITE OF RUBBER AND FILM OF SYNDIOTACTIC POLYBUTADIENE INTEGRAL WITH ITS SURFACE

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1051 days.

(21) Appl. No.: 12/246,037

(22) Filed: Oct. 6, 2008

(65) Prior Publication Data

US 2010/0084071 A1    Apr. 8, 2010

(51) Int. Cl.
*B60C 1/00* (2006.01)
*B60C 13/00* (2006.01)
*C08C 19/20* (2006.01)

(52) U.S. Cl.
USPC ........... 152/151; 526/335; 152/451; 152/450; 524/493; 524/495; 524/571

(58) Field of Classification Search
USPC ........... 152/451, 151, 450; 526/335; 524/493, 524/495, 571
See application file for complete search history.

(56) References Cited

U.S. PATENT DOCUMENTS

| 4,463,146 A | 7/1984 | Donbar et al. ............... 526/142 |
|---|---|---|
| 4,790,365 A * | 12/1988 | Sandstrom et al. ........... 152/510 |
| 4,957,970 A | 9/1990 | Holzapple et al. ............... 525/99 |
| 5,011,896 A | 4/1991 | Bell et al. ............... 526/92 |
| 5,091,467 A | 2/1992 | Beers ............... 525/57 |
| 5,307,850 A * | 5/1994 | Halasa et al. ............... 152/209.5 |
| 5,859,142 A * | 1/1999 | Muraoka et al. ............... 525/236 |
| 6,956,093 B1 | 10/2005 | Hsu et al. ............... 526/335 |
| 2002/0036043 A1 * | 3/2002 | Victor Thielen ............... 152/517 |
| 2006/0219343 A1 * | 10/2006 | Hochi ............... 152/517 |

FOREIGN PATENT DOCUMENTS

EP        359694 A1 *   3/1990

OTHER PUBLICATIONS

UBE America Inc., Products, 2009.*
Kirk-Othmer Encyclopedia of Chemical Technology: Polybutadiene, 2000.*

* cited by examiner

*Primary Examiner* — James J Seidleck
*Assistant Examiner* — Deve E Valdez
(74) *Attorney, Agent, or Firm* — Henry C. Young, Jr.

(57) ABSTRACT

This invention relates to a tire having at least one rubber component which contains a cast, extruded, or calendered film of syndiotactic polybutadiene polymer. The syndiotactic polybutadiene polymer film is integral with the surface of the rubber component in a sense of being co-cured therewith. Such film may be added directly to the tire during the building process or involve a separate process of producing a tire component as a composite of the film and a rubber composition (rubber component) prior to the tire building stage. Such composite can be as is or partially pre-cured before being applied in the tire building process. The syndiotactic polybutadiene polymer film is provided to promote both stability and age durability for the tire component.

6 Claims, 2 Drawing Sheets

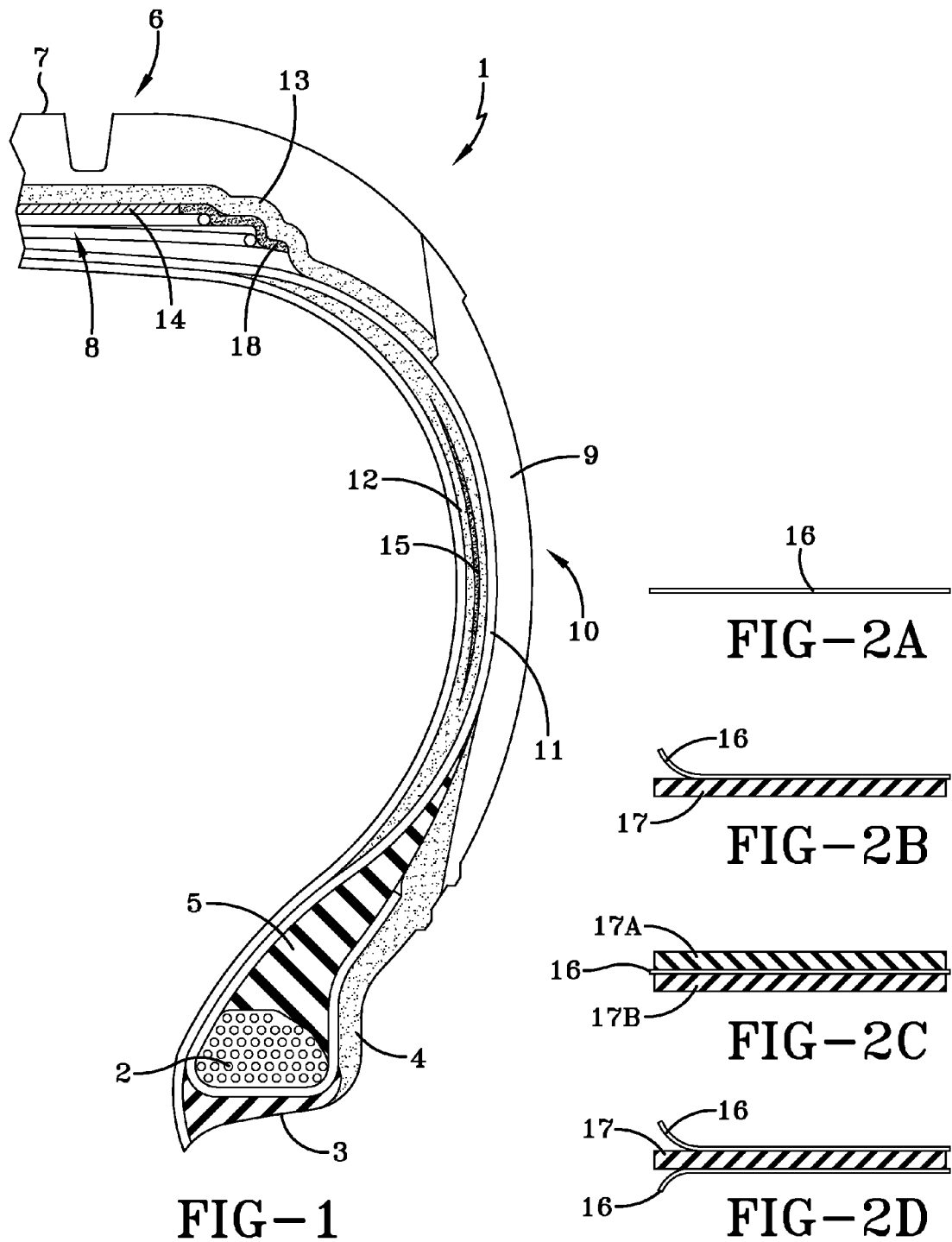

TIRE WITH RUBBER COMPONENT COMPRISED OF A COMPOSITE OF RUBBER AND FILM OF SYNDIOTACTIC POLYBUTADIENE INTEGRAL WITH ITS SURFACE

FIELD OF THE INVENTION

This invention relates to a tire having at least one rubber component which contains a cast, extruded, or calendered film of syndiotactic polybutadiene polymer. The syndiotactic polybutadiene polymer film is integral with the surface of the rubber component in a sense of being co-cured therewith. Such film may be added directly to the tire during the building process or involve a separate process of producing a tire component as a composite of the film and a rubber composition (rubber component) prior to the tire building stage. Such composite can be as is or partially pre-cured before being applied in the tire building process. The syndiotactic polybutadiene polymer film is provided to promote both stability and age durability for the tire component.

BACKGROUND OF THE INVENTION

Pneumatic rubber tires are composed of a plurality of various rubber based components which experience varying degrees of dynamic stress during the working of the tire.

For this invention, it is desired to promote stabilization of a tire rubber component in a form of a thin layer of syndiotactic polybutadiene polymer integral with at least one rubber component.

Syndiotactic polybutadiene polymer in the form of a film (e.g. film of a polybutadiene polymer containing a high content of vinyl 1,2-structure) is well known to those having skill in the pertinent art.

In general, syndiotactic polybutadiene polymer differs from other polybutadienes (e.g. differs from cis 1,4-polybutadiene rubber) in a sense that it has a vinyl 1,2-content of at least 80 percent which may vary, for example, from about 80 percent to at least about 96 percent, a thin film of which tends to be flexible although is not considered as being elastomeric in general. Moreover, it has little to no building tack for adhering to uncured conjugated diene-based rubber compositions unless it is first blended with one or more elastomers which ordinarily required an addition of a compatibilizer and perhaps a tackifying resin to do so. Therefore, an unwanted movement of the film might occur against an uncured rubber component in some cases during the tire building and forming process unless the film is at least partially pre-cured against the rubber component to form a pre-formed composite thereof prior to the tire building process, depending somewhat upon the tire component and its location in the tire assembly.

For this invention, it is desired to apply a thin syndiotactic polybutadiene film to a tire component to promote higher stability for that component. Accordingly, it is desired that no elastomer, compatabilizing agent or tackifying resin be physically blended with the syndiotactic polybutadiene, unless used in very small amounts which does not compromise the melting point of the syndiotactic polybutadiene.

Such syndiotactic polybutadiene polymer tends to be a relatively rigid (limited flexibility) crystalline polymer with poor solubility in elastomers without addition of a compatibilizer. For this invention, as indicated above, the syndiotactic polybutadiene polymer is applied as a thin film so that it presents some flexibility and is not blended with the rubber composition of the rubber component nor a compatibilizer.

The melting point (MP) of syndiotactic polybutadiene polymer varies with the content of its 1,2-microstructure. For example, typical MP values may range from about 120° C. at about an 80 percent vinyl 1,2-content up to about 200° C. to 210° C. for about a 96 percent vinyl 1,2-content for its microstructure.

Historically, a blend of syndiotactic polybutadiene polymer and a terpolymer of ethylene, vinyl acetate and vinyl alcohol, together with a compatibilizing agent, is mentioned for use as a tire innerliner in U.S. Pat. No. 5,091,467.

A process for preparing syndiotactic polybutadiene is mentioned in U.S. Pat. Nos. 4,463,146, 5,011,896 and 6,956,093.

Rubber compounding ingredients packaged in a film of syndiotactic polybutadiene as well as rubber containing a mixture of such package and sulfur curable rubber is mentioned in U.S. Pat. No. 4,957,970.

For this invention, it is desired to use a syndiotactic polybutadiene without being mixed with and therefore in an absence of (e.g. to the exclusion of) an elastomer or a terpolymer of ethylene, vinyl acetate and vinyl alcohol, whether or not used with a compatibilizing agent, although is it desired herein that it not be used with a compatibilizer.

For this invention, it is desired that the syndiotactic polybutadiene polymer has a melt point (MP) temperature of at least 120° C., alternately from about 160° C. to about 220° C., so that it retains a significant degree of dimensional stability and thereby adds stiffness and dimensional stability and support for the associated tire component at a relatively high temperature within the tire as the tire generates internal heat when it is being dynamically worked. Various tire components are expected to operate at different temperatures within the tire as the tire is operating to generate dynamic internal temperature, with some components expected to operate at higher temperatures. Accordingly, a range of melt point (MP) temperatures are presented for the syndiotactic polybutadiene polymer with the higher melt point (MP) temperature often being preferred for the associated tire components (tire components associated in a sense of containing the integral syndiotactic polybutadiene film).

For the practice of this invention, said syndiotactic polybutadiene polymer may contain a dispersion of one or more reinforcing fillers. In order to make the syndiotactic polymer integral with the rubber component, it is co-cured with a sulfur curable rubber component. For such co-curing of the film of syndiotactic polybutadiene to a sulfur curable rubber for the tire component at the interface between the rubber component and syndiotactic polybutadiene film, the co-curing of the syndiotactic polybutadiene film may rely upon:

(A) one or more sulfur curatives contained within the syndiotactic polybutadiene polymer, (B) one or more sulfur curatives contained within the sulfur curable rubber of the rubber component, or (C) one or more sulfur curatives contained in each of the syndiotactic polybutadiene film and sulfur curable rubber component.

The syndiotactic polybutadiene film is made integral with the sulfur curable rubber component by co-curing the film and component together at an elevated temperature in which the film and rubber component are made integral with each other at the interface between the film and rubber component.

For the practice of this invention, the sulfur rubber component may be comprised of a composite of the syndiotactic polybutadiene film positioned on and integral with at least one of the external surfaces of a rubber composition comprised of a conjugated diene-based elastomer. In this manner, then, (A) the composite may be a rubber component which contains a thin syndiotactic polybutadiene film positioned on and integral with one of its surfaces, or (B) the composite may be a rubber component positioned between and integral with two syndiotactic polybutadiene films. Such rubber component may then be considered as being sandwiched between and integral with two syndiotactic polybutadiene films, or (C) the composite may be a syndiotactic polybutadiene polymer film positioned between and integral with two rubber components. Such composite may then be considered as being a thin syndiotactic polybutadiene film sandwiched between and integral with two rubber components of the tire.

In practice, a composite of the syndiotactic polybutadiene film and rubber component may be a pre-formed, and may optionally be a partially pre-cured, composite (partially pre-cured under conditions of elevated temperature and pressure to form the composite) prior to building the composite into the tire and the resulting assembly cured in a suitable mold under conditions of elevated temperature and pressure to form the resultant tire.

A significant aspect of this invention is the promotion of dimensional stability (e.g. promote a degree of rigidity) for the tire component provided by the integral syndiotactic polybutadiene polymer film on the rubber surface which is adhered to the rubber in a sense of being co-cured therewith instead of use of an adhesive layer between the rubber and syndiotactic polybutadiene film.

Another significant aspect of the invention is the formation of an air barrier layer (e.g. oxygen barrier layer) within the tire which will provide a reduced flow of air, particularly oxygen, into the tire component which will thereby promote improved age durability for the tire itself.

Further, it is desired to not blend the syndiotactic polybutadiene film with elastomers because such addition to the syndiotactic polybutadiene is seen herein as tending to dilute, or degrade, the aforesaid dimensional stability and barrier property promotion by the integral syndiotactic polybutadiene polymer film.

In the description of this invention, the term "phr" where used means "parts of material by weight per 100 parts by weight of rubber". The terms "rubber" and "elastomer" may be used interchangeably unless otherwise indicated. The terms "rubber composition" and "compound" may be used interchangeably unless otherwise indicated.

The term "melting point, or MP" as used herein means the melting temperature of the syndiotactic polybutadiene polymer measured by conventional differential scanning calorimetry using a 10° C./minute temperature rise.

SUMMARY AND PRACTICE OF THE INVENTION

In accordance with this invention a tire is provided having at least one component comprised of a composite of rubber and film of syndiotactic polybutadiene polymer integral with and external to the rubber composite.

In practice, said syndiotactic polybutadiene polymer has a melting point (MP) of at least about 120° C. alternately at least about 160° C. and alternately in a range of from about 160° C. to about 220° C. to promote dimensional stability of the tire component by the integral syndiotactic polybutadiene film as the component experiences (is operated at) higher operating temperatures caused by internal heat dynamically generated during the running (operation) of the tire.

In practice, it is desired that said syndiotactic polybutadiene film has a thickness in a range of from about 1 millimeter (mm) to about 20, mm, alternately from about 2 to about 10 mm, depending somewhat upon the tire size and structure and specific individual tire component itself.

In additional accordance with this invention, said syndiotactic polybutadiene polymer film is integral with said rubber of said rubber composite by being co-cured therewith (sulfur co-cured).

In practice, the syndiotactic polybutadiene polymer film is made integral with said sulfur curable rubber by co-curing (sulfur co-curing) said film to said rubber at the interface between said syndiotactic polybutadiene polymer film and said rubber of said composite.

In practice, said syndiotactic polybutadiene polymer has a vinyl 1,2-microstructure of at least 80 percent alternately up to about 96 percent, so long as its melting point is at least 120° C. and alternately at least 160° C.

Further, in the practice of this invention, it is desired to use a syndiotactic polybutadiene without being mixed with and therefore in an absence of (e.g. to the exclusion of) an elastomer or a terpolymer of ethylene, vinyl acetate and vinyl alcohol.

In additional practice of this invention, said syndiotactic polybutadiene polymer contains a dispersion of one or more reinforcing fillers, which may comprise of one or more of rubber reinforcing carbon black and precipitated (synthetic amorphous) silica, preferably rubber reinforcing carbon black.

In further practice of this invention, to enable sulfur co-curing of the syndiotactic polybutadiene film at the interface of said syndiotactic polybutadiene film and rubber composition of said composite, said co-curing relies upon:

(A) one or more sulfur curatives contained within the syndiotactic polybutadiene polymer, or (B) one or more sulfur curatives contained within the sulfur curable rubber of the rubber component, (C) one or more sulfur curatives contained in each of the syndiotactic polybutadiene film and sulfur curable rubber component.

Such curatives may include, for example, sulfur, and one or more sulfur cure accelerators which are sulfur curatives well known to those having skill in such art.

In additional practice of this invention, for said composite:

(A) the rubber component of said composite has a syndiotactic polybutadiene polymer film positioned on and integral with one of its surfaces, or (B) the rubber component of said composite is positioned between and integral with two syndiotactic polybutadiene films (Such rubber component of said composite may then be considered as being sandwiched between and integral with two syndiotactic polybutadiene films), or (C) the syndiotactic polybutadiene polymer film is positioned between and integral with at least two rubber components of the tire. (Such syndiotactic polybutadiene polymer film may then be considered as being sandwiched between two rubber components of the tire)

In further accordance with this invention, said composite of the syndiotactic polybutadiene film and rubber component may be pre-formed as a partially pre-cured composite (partially pre-cured under conditions of elevated temperature and pressure to form the composite) prior to building the composite into the tire to form a tire assembly thereof. The resulting tire assembly is cured in a suitable mold under conditions of elevated temperature and pressure to from a tire.

In practice, said film of integral syndiotactic polybutadiene polymer film is provided to promote (provide) dimensional stability (e.g. rigidity) and reduced air (particularly oxygen)

permeability for the tire component to which it is integrally adhered to form a composite thereof.

Therefore, in accordance with this invention, a tire is provided wherein said syndiotactic polybutadiene polymer film is a stabilizing element and oxygen (air) barrier for at least one tire component.

In further practice of this invention, the interface between said syndiotactic polybutadiene polymer film and said rubber is exclusive of an adhesive therebetween.

In practice, said tire component for said syndiotactic polybutadiene polymer stabilizing element and oxygen barrier may be, for example, at least one of an internal tire sidewall insert as a tire apex, an internal tire sidewall insert spaced apart from the tire sidewall, tire tread carcass overlay layer underlying the tread of said tire, cover strip positioned on peripheral edges of a tire circumferential belt reinforcement, tire bead portion, and tread base layer, etc.

THE DRAWING

A Drawing is provided in order to further understand the invention.

FIG. 1 represents a cross-section of a pneumatic tire which contains one or more components as a composite of rubber and thin film which is positioned thereon and integral with a rubber component.

FIG. 2 represents a syndiotactic polybutadiene film and composites composed of the film and rubber components.

Figure 3:
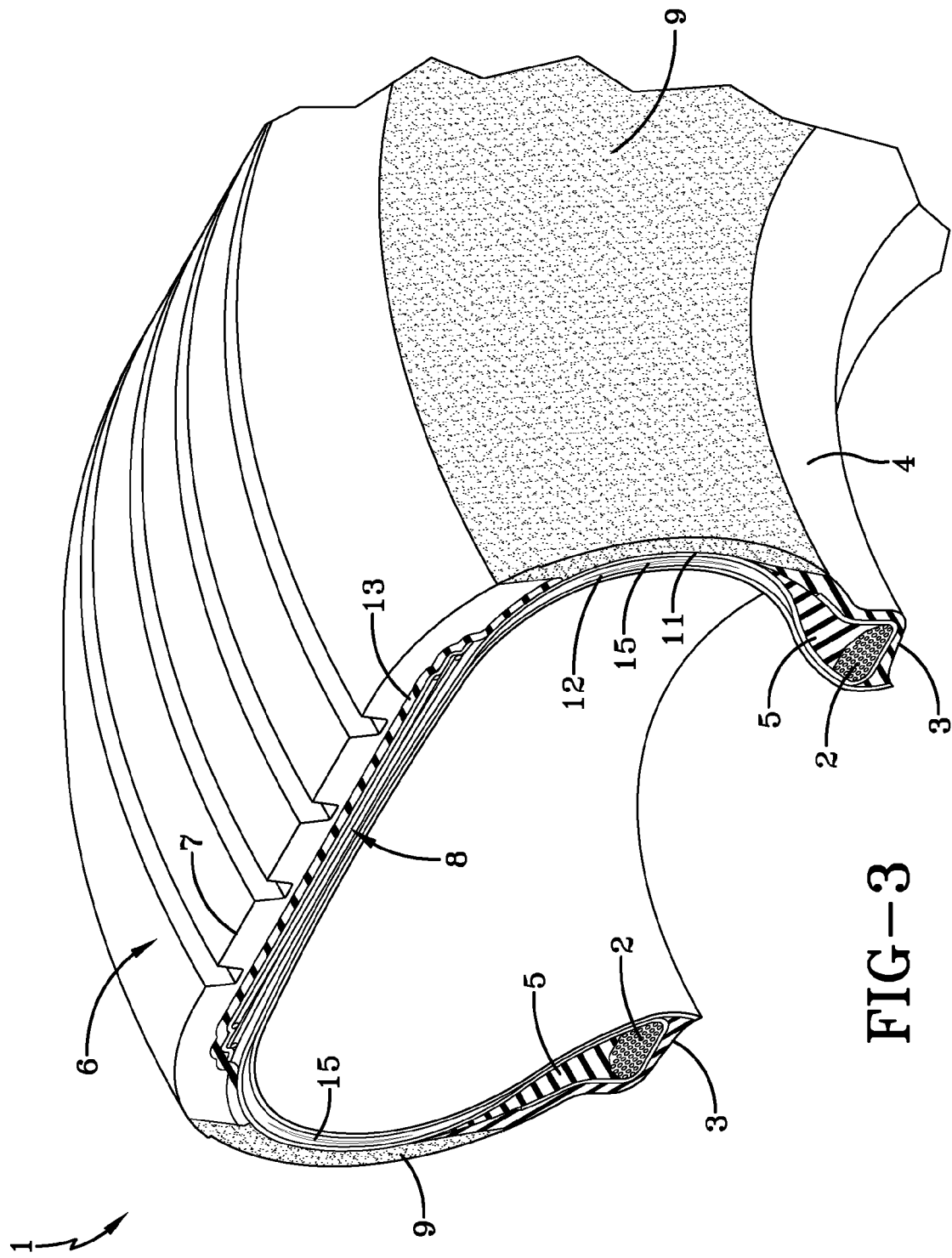

FIG. 3 presents a prospective view of the cross sectional view of the tire of FIG. 1.

IN THE DRAWING

For FIG. 1, a tire (6) is presented having a tread composed of an outer tread rubber cap layer component (7); an underlying tread rubber base layer component (13); circumferential cord reinforced rubber belt component (8); a overlay layer (combination of 14 and 18) underlying said tread rubber base layer component (13) and overlaying said belt component (8); a belt edge protective strip layer component (18) positioned over the ends of the belt component (8); a bead component (2) comprised of a plurality of wire cords; a bead toe guard component (3); a chafer rubber component (4) to fit against a metal rim (not shown); a rubber apex component (5) extending axially outward from said bead component (2) a tire sidewall (10) which includes an external rubber sidewall layer component (9); cord reinforced rubber carcass ply component (11); internal sidewall layer component (12) positioned axially inward of said carcass ply (11) which contains an internal sidewall reinforcing rubber insert component (15) which is positioned axially outward and spaced apart from said apex component (5).

FIG. 2A represents a cross sectional view of a thin syndiotactic polybutadiene film (16).

FIG. 2B represents a cross sectional view of a tire component as a composite composed of rubber composition (17) having a thin syndiotactic polybutadiene film (16) integrally adhered thereto.

FIG. 2C represents a cross sectional view of a tire component as a composite composed of a thin syndiotactic polybutadiene film (16) integral with and sandwiched between two rubber compositions (17A) and (17B).

FIG. 2D represents a cross sectional view of a tire component as a composite composed of a rubber composition (17) integral with and sandwiched between two thin syndiotactic polybutadiene films (16).

In FIG. 1, tire components are presented as composites of any of FIG. 2B, FIG. 2C and FIG. 2D as said tread rubber base layer component (13); said belt edge strip and/or overlay layer component (14); said bead toe guard component (10); said chafer rubber component (4); said rubber apex component (5) and said internal sidewall reinforcing rubber insert component (12) which is positioned axially outward and spaced apart from said apex component (5).

In FIG. 1, said tire component composites promote stabilization of the tire, in a sense of promoting dimensional stability and, further, promote better age stability for the tire itself by reducing oxygen permeability.

For FIG. 1, said syndiotactic polybutadiene polymer has a melt point (MP) of about 120° C. and a vinyl 1,2-content about 80 percent.

FIG. 3 presents a prospective view of the cross sectional view of the tire of FIG. 1.

In practice, the tire may be built, molded and cured by conventional methods well known to those having skill in such art.

The rubber composition to which the syndiotactic polybutadiene polymer film is to be adhered (by co-curing, particularly by sulfur co-curing) may be compounded by conventional methods known to those having skill in such art.

Such rubber composition may, for example, contain one or more various sulfur curable elastomers. Such sulfur curable elastomers may be, for example, at least one of polymers of at least one of isoprene and 1,3-butadiene and copolymers of styrene and at least one of isoprene and 1,3-butadiene.

Such compounding of the rubber composition, for example only, may be provided by mixing the various sulfur-vulcanizable constituent rubbers with various commonly used additive materials such as, and for example only, curing aids, such as sulfur, activators, retarders and accelerators, processing additives, where appropriate. Various other ingredients may be, for example, various rubber processing oils, resins which might be for example tackifying resins, plasticizers, reinforcing fillers (e.g. at least one of rubber reinforcing carbon black and synthetic silica), pigments and waxes, where appropriate. As known to those skilled in the art, depending on the intended use of the sulfur vulcanizable and sulfur vulcanized material (rubbers), the additives mentioned above are selected and commonly used in conventional amounts.

The rubber composition would normally contain at least one fatty acid (e.g. stearic acid) and zinc oxide.

Typical amounts of tackifier resins, if used, might comprise, for example only, from about 1 to about 10 phr, for example, about 1 to about 5 phr, where appropriate. Typical amounts of processing aids, if used, may comprise, for example only, aromatic, naphthenic, and/or paraffinic processing oils. Typical amounts of waxes, if used, may comprise for example only from about 1 to about 5 phr. Sometimes microcrystalline waxes might be used if appropriate. Typical amounts of peptizers if used might comprise, for example, about 0.1 to about 1 phr. Typical peptizers might be, for example, pentachlorothiophenol and dibenzamidodiphenyl disulfide, where appropriate.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component comprised of a composite of a sulfur cured rubber composition containing a film having a thickness in a range of from about 2 to about 10 millimeters (mm) integral with an external surface of said rubber composition, where said film is comprised of a polymer consisting of syndiotactic polybutadiene polymer exclusive of additional elastomer(s), and wherein said syndiotactic polybutadiene has a melting point in a range of about 160° C. to about 220° C. and contains a dispersion of reinforcing filler comprised of at least one of rubber reinforcing carbon black and precipitated silica.

2. The tire of claim 1 wherein for said composite:
(A) the said rubber composition is positioned between and integral with two of said syndiotactic polybutadiene films, or
(B) the said syndiotactic polybutadiene polymer film is positioned between and integral with at least two of said rubber compositions of said composite.

3. The tire of claim 1 wherein the interface between said syndiotactic polybutadiene polymer film and said rubber composition of said composite thereof is exclusive of an adhesive therebetween.

4. The tire of claim 1 wherein said tire component is at least one of an internal tire sidewall insert as a tire apex, an internal tire sidewall insert spaced apart from the tire sidewall apex, tire tread carcass overlay layer underlying the tread of said tire, cover strip positioned on peripheral edges of a tire circumferential belt reinforcement, tire bead portion, and tread base layer.

5. The tire of claim 1 wherein the said rubber composition is positioned between and integral with two of said syndiotactic polybutadiene films.

6. The tire of claim 1 wherein the said syndiotactic polybutadiene polymer film is positioned between and integral with at least two of said rubber compositions of said composite.

* * * * *